(12) United States Patent
Maleki et al.

(10) Patent No.: US 12,232,029 B2
(45) Date of Patent: Feb. 18, 2025

(54) USER EQUIPMENT (UE) SLEEP MODE ADAPTATION

(71) Applicant: Telefonaktiebolaget LM Ericsson (publ), Stockholm (SE)

(72) Inventors: Sina Maleki, Malmö (SE); Andres Reial, Lomma (SE); Gang Zou, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 363 days.

(21) Appl. No.: 17/635,505

(22) PCT Filed: Aug. 16, 2019

(86) PCT No.: PCT/EP2019/072061
§ 371 (c)(1),
(2) Date: Feb. 15, 2022

(87) PCT Pub. No.: WO2021/032270
PCT Pub. Date: Feb. 25, 2021

(65) Prior Publication Data
US 2022/0353809 A1 Nov. 3, 2022

(51) Int. Cl.
*H04W 52/02* (2009.01)
*H04W 76/28* (2018.01)

(52) U.S. Cl.
CPC ... *H04W 52/0212* (2013.01); *H04W 52/0229* (2013.01); *H04W 76/28* (2018.02)

(58) Field of Classification Search
CPC ......... H04W 52/0212; H04W 52/0229; H04W 76/28
USPC ......................................................... 370/311
See application file for complete search history.

(56) References Cited

U.S. PATENT DOCUMENTS

2018/0288702 A1   10/2018  Kang et al.

OTHER PUBLICATIONS

R1-1812333 (Year: 2018).*
R1-1813960 (Year: 2018).*
R1-1814286 (Year: 2018).*
R1-1906353 (Year: 2019).*
3GPP, "3rd Generation Partnership Project; Technical Specification Group Radio Access Network; NR; Physical layer procedures for data (Release 15)," 3GPP TS 38.214 V15.6.0, Jun. 2019, 1-105.

(Continued)

*Primary Examiner* — Intekhaab A Siddiquee
(74) *Attorney, Agent, or Firm* — Murphy, Bilak & Homiller, PLLC (57) ABSTRACT

A wireless device, such as a user equipment, UE, determines (410) a first sleep opportunity for the wireless device and evaluates (420) one or more energy-related parameters for each of a plurality of possible sleep modes for the wireless device. The plurality of possible sleep modes correspond to varying degrees of reduced energy consumption by the wireless device, relative to a non-sleep mode. The wireless device selects (430) a first one of the plurality of possible sleep modes for the wireless device, based on this evaluating, and activates (440) the selected sleep mode during the first sleep opportunity.

18 Claims, 5 Drawing Sheets

(56) References Cited

OTHER PUBLICATIONS

3GPP, "3rd Generation Partnership Project; Technical Specification Group Radio Access Network; NR; Physical layer procedures for control (Release 15)", 3GPP TS 38.213 V15.6.0, Jun. 2019, 1-107.

3GPP, "3rd Generation Partnership Project; Technical Specification Group Radio Access Network; NR; Study on UE Power Saving (Release 16)", 3GPP TR 38.840 V2.0.0, May 2019, 1-73.

3GPP, "3rd Generation Partnership Project; Technical Specification Group Radio Access Network; NR; Physical channels and modulation (Release 15)", 3GPP TS 38.211 V15.3.0, Sep. 2018, 1-96.

CATT, "Presentation of Specification/Report to TSG: TR 38.840v2.0.0", 3GPP TSG-RAN Meeting #84, RP-191083, Newport Beach, USA, Jun. 3-6, 2019, 1 page.

Ericsson, "Power saving considerations", 3GPP TSG-RAN2 Meeting #106, R2-1906609, (Revision of R2-1901275), Reno, USA, May 13-17, 2019, 1-5.

Ericsson, "Procedure for cross-slot scheduling technique", 3GPP TSG-RAN WG1#96, Tdoc R1-1905467, Xi'an, China, Apr. 8-12, 2019, 1-6.

Huawei, et al., "Reducing RRM measurements for UE power saving", 3GPP TSG RAN WG1 Meeting #97, R1-1907520, Reno, USA, May 13-17, 2019, 1-8.

LG Electronics, "Discussion on evaluation methodology for UE power consumption", 3GPP TSG RAN WG1 Meeting #95, R1-1813960, Spokane, USA, Nov. 12-16, 2018, 1-9.

Vivo, "Power consumption simulation results", 3GPP TSG RAN WG1 #95, R1-1812333, Spokane, USA, Nov. 12-16, 2018, 1-5.

Vivo, "Summary of UE power Consumption Reduction in RRM Measurements", 3GPP TSG RAN WG1 Meeting #95, R1-1814286, Spokane, USA, Nov. 12-16, 2018, 1-18.

\* cited by examiner

USER EQUIPMENT (UE) SLEEP MODE ADAPTATION

TECHNICAL FIELD

The present disclosure is generally related to the operation of wireless devices in wireless communication networks and is more particularly related to techniques for efficiently using sleep modes, in which portions of a wireless device's circuitry are inactivated or operated in low-power modes to reduce energy consumption.

BACKGROUND

In the Long-Term Evolution (LTE) wireless communication networks developed by members of the $3^{rd}$-Generation Partnership Project (3GPP), a user equipment (UE) connected to the network, i.e., in RRC Connected mode, monitors the Physical Downlink Control Channel (PDCCH) to see whether it is scheduled to receive data in the Physical Downlink Shared Channel (PDSCH). As part of this monitoring, the UE needs to decode PDCCH occasions in a so-called search space, i.e., a set of combinations of time-frequency resources and configurations. The UE decodes these PDCCH occasions blindly, i.e., without knowing ahead of time whether this (or any other) PDCCH occasion includes a message for the UE. After blind decoding each occasion, the UE can determine whether the PDCCH occasion carries a message meant for it, by applying a cyclic-redundancy check (CRC) to the decoded PDCCH, using the UE's Cell Radio Network Temporary Identifier (C-RNTI).

In any given LTE subframe, the UE may receive no scheduling message at all, which means that the UE may consume significant power resources monitoring the PDCCH, even when the transfer of actual data to or from the UE is infrequent. To reduce the number of PDCCH monitoring occasions in which the UE receives no downlink or uplink grant, a Connected Discontinuous Reception (C-DRX) mechanism is envisaged under which the UE is configured by the network with a long Discontinuous Reception (DRX) cycle, or both a short and a long DRX cycle. These cycles have relatively short on-interval, or "active time," during which the UE is fully "awake" and is able to monitor the PDCCH and carry out other activities. Between the on-intervals are intervening off-intervals, during which portions of the UE, such as the radio circuitry, may be inactivated, and/or during which processing circuitry may be put into a state of lower power consumption. This state of lower power consumption may be referred to as a "sleep mode," or "sleep state."

In the event the UE does not receive a grant during the on-interval of the C-DRX cycle, or after the inactivity timer has expired, the UE moves to the sleep mode for the remainder of the short DRX cycle (or the long DRX cycle, if no short DRX cycle is configured), and stays there for a preconfigured amount of time. If no grant is received in the next on-interval, the UE moves to the long DRX cycle, until the next on-interval. The lengths of the short and long DRX cycles as well as the length of the inactivity timer are preconfigured by the network, and do not change dynamically. Most of the time, these values remain fixed for a long duration; the network settles on these values based primarily on the traffic assigned to the UE; parameters such as power status of the UE are not considered.

3GPP is currently developing standards for a $5^{th}$-Generation (5G) wireless communication system, which includes a Radio Access Network (RAN) technology often referred to as "New Radio," or NR. NR is being designed to provide service for multiple use cases such as enhanced mobile broadband (eMBB), ultra-reliable and low latency communication (URLLC), and machine-type communication (MTC). Each of these services has different technical requirements. For example, the general requirement for eMBB is support for high data rates with moderate latency and moderate coverage, while URLLC service requires low latency and high-reliability transmission, with perhaps more moderate data rates.

Features of NR include that a user equipment (UE) can be configured with up to four carrier bandwidth parts (BWPs) in the downlink, with a single downlink carrier bandwidth part being active at a given time. A UE can be configured with up to four carrier bandwidth parts in the uplink, with a single uplink carrier bandwidth part being active at a given time. If a UE is configured with a supplementary uplink, the UE can additionally be configured with up to four carrier bandwidth parts in the supplementary uplink with a single supplementary uplink carrier bandwidth part being active at a given time.

One approach to provide for low-latency data transmission in NR is to allow shorter transmission time intervals. In NR, in addition to transmission in a slot, a mini-slot transmission is also possible, to reduce latency, where a mini-slot may consist of any number of 1 to 14 OFDM symbols. The concepts of slot and mini-slot are not specific to a specific service, meaning that a mini-slot may be used for either eMBB, URLLC, or other services.

In both LTE and NR networks, UE power consumption is an important metric that needs to be enhanced. As evidenced by LTE field logs, significant power can be spent on monitoring the PDCCH in LTE based on one DRX setting. The situation can be similar in NR if similar DRX settings with traffic modelling are utilized, as the UE needs to perform blind detection in its configured control resource sets (CORESETs) to identify whether there is a PDCCH sent to it and act accordingly. Techniques that can reduce unnecessary PDCCH monitoring can be beneficial. Additional techniques that more fully exploit the power-savings opportunities provided by these efforts to reduce PDCCH monitoring are also needed.

SUMMARY

According to several of the embodiments disclosed herein, a user equipment (UE) or other wireless device is able to adapt its sleep mode beyond a default mode, based on a specific operation timeline or based on received power saving triggers. Using the disclosed techniques, a UE may choose the optimal sleep mode under any of a variety of circumstances, e.g., during C-DRX OFF duration, during the active time, and in RRC_Idle/Inactive states, considering existing and anticipated NR signal structures and signaling mechanisms.

The selection of a sleep mode for any given sleep opportunity may be based on, on the one hand, on required measurement and monitoring operations and power saving triggers received (e.g., wake-up signaling (WUS), cross-slot scheduling indication, PDCCH skipping, etc.), and on the other hand, transition times and transition energies associated with entering and exiting different available sleep modes and the ability to maintain tuning parameters in those modes. In some embodiments or instances, the UE may advance or reschedule the sequence and timing of monitoring or measurement operations to obtain more efficient sleep patterns, if permitted by the reception scenarios. According to several of the disclosed embodiments, a wireless device can adapt its sleep mode beyond the default one in order to achieve power savings and reduce total energy consumption, while still carrying out the expected operations of the wireless device.

An example method is carried out by a wireless device, such as a UE, and comprises the wireless device determining a first sleep opportunity for the wireless device and evaluating one or more energy-related parameters for each of a plurality of possible sleep modes for the wireless device. The plurality of possible sleep modes correspond to varying degrees of reduced energy consumption by the wireless device, relative to a non-sleep mode. The wireless device selects a first one of the plurality of possible sleep modes for the wireless device, based on this evaluating, and activates the selected sleep mode during the first sleep opportunity.

Another example method is also carried out by a wireless device, and also comprises the wireless device determining a sleep opportunity for the wireless device. In this example method, the wireless device evaluates one or more energy-related parameters for at least one sleep mode for the wireless device, this sleep mode corresponding to a state of reduced energy consumption by the wireless device, relative to a non-sleep mode, and adjusts a planned timing of one or more receiver monitoring or measurement operations and/or omits one or more receiver monitoring or measurement operations, based on this evaluation. The wireless device then activates the sleep mode.

Also described herein are wireless device apparatuses corresponding to the methods summarized above, as well as variations of these methods and apparatuses.

DETAILED DESCRIPTION

Figure 1:
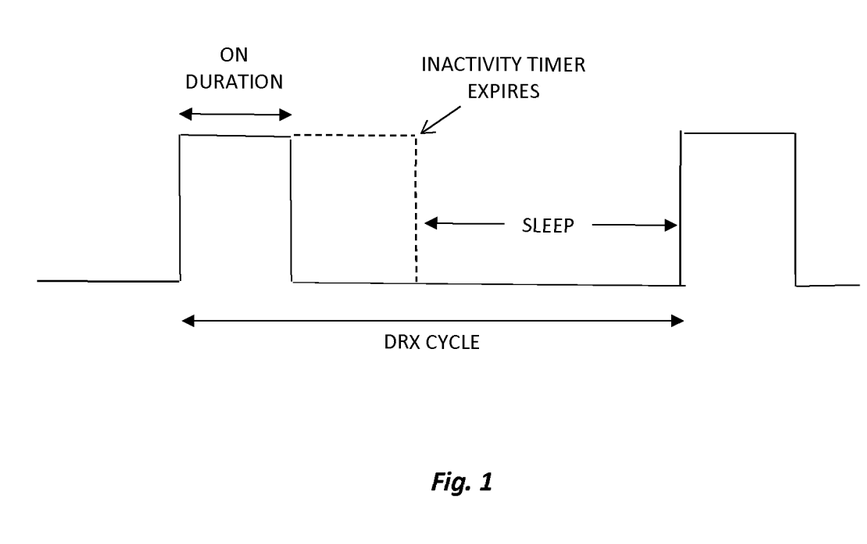
FIG. 1 illustrates discontinuous reception (DRX) operation.

FIG. 1 illustrates a simplified, generic, discontinuous reception (DRX) operation. As seen in the figure, DRX allows the UE to transition to a lower-power state, referred to herein as a "sleep mode," for an interval of time during which the UE is not required to receive any transmission from the base station. There is an on-interval, or "active time," having a length of at least on Duration, where the UE is awake and monitors for control channels. If there is no control message detected by the UE, then an inactivity timer begins, and the UE continues to monitor for control channel until a valid control message addressed to the UE is received or the inactivity timer expires. Each time the UE receives a valid control message, it restarts the inactivity timer and continues to monitor the PDCCH. If the inactivity timer expires, the UE can stop receiving transmissions from base station (e.g., performing no control monitoring) for an off interval that lasts until the end of the DRX cycle. Typically, the DRX parameters, i.e., the DRX cycle length, the onDuration, and the inactivity timer length, are configured for the UE via Radio Resource Control (RRC). Some DRX procedures are modified by other DRX parameters, which may be round-trip time (RTT) related, hybrid automatic-repeat-request (HARQ)-related, etc. The on-interval, which includes the Onduration and the time duration when the inactivity timer is running, is also referred to as "active time."

In summary, the following terms are typically associated with DRX operation in LTE (the details and/or terminology may vary for other systems:
   active time: time related to DRX operation, during which the MAC entity monitors the PDCCH.
   DRX cycle: specifies the periodic repetition of the OnDuration followed by a possible period of inactivity (see FIG. 1).
   inactivity timer: Generally, limits the number of consecutive PDCCH-subframe(s)/slots during which the UE remains "awake," after the most recent subframe/slot in which a PDCCH indicates a data transmission to or from a MAC entity of the wireless device. A MAC entity is a medium access control entity, and there is one MAC entity per configured cell group, for example, one MAC entity for the master cell group and one for the secondary cell group.

As mentioned above, DRX functionality is configured by RRC, which typically operates on a slower scale than the MAC or Physical layers. Thus, the DRX parameter settings, etc., cannot be changed on a dynamic (fast-changing) basis through RRC configuration, especially if the UE has a mix of traffic types.

In some UE implementations, the default assumption is that the UE moves to a deep sleep state if possible, in which, much of its hardware is powered off or switched to a low-power mode of operation, after the end of the inactivity time in DRX/C-DRX, or at the start of C-DRX OFF duration in the event that the C-DRX off duration is long enough. The same assumption holds when the UE moves to RRC_Idle/Inactive modes.

In addition to DRX, however, there are several new features and signaling being discussed and under development to adapt UE power consumption, such as cross-slot scheduling, wake-up signaling (WUS), go-to-sleep (GTS) signaling, PDCCH skipping and PDCCH periodicity adaptation, which provide additional opportunities for the UE to go to sleep in order to save power. PDCCH skipping refers to a technique whereby the network indicates to the UE that it may omit monitoring, i.e., skip, of the PDCCH for certain subframes or slots, or during a certain time duration. This might be done dynamically, where the network signals the UE that it may skip monitoring PDCCH for the next X slots, since the network does not expect to schedule the UE during that interval. Alternatively, the UE might be pre-configured with the number X, with dynamic signaling used to indicate when a skipping interval begins, or a certain timer is expired. It will be appreciated that these PDCCH skipping occasions provide opportunities for the UE to go to sleep, depending on what other operational requirements the UE needs to meet during these times. Wake-up signaling (WUS) refers to a technique whereby a UE is configured with a specific WUS, that can be detected by the UE as a certain signal, referred to as a wake-up signal. This allows an idle-mode UE, for example, to remain in sleep mode for extended periods of time—when the network needs to page the UE, it can first send a wake-up signal, which triggers the UE to come out of its sleep mode, and then follow up with a conventional paging message. The same can be applied to a UE in RRC-Connected mode, e.g., before an ON duration, the UE may detect a WUS indicating that the UE should wake-up for the next ON duration, or if not detected, it does not need to monitor the ON-duration. Go-to-sleep (GTS) signaling refers to the converse mechanism, i.e., where a signal is sent to the UE to indicate that no paging for the UE is expected, and that it may thus go to sleep (perhaps subject to other operational requirements that the UE must meet), or no more data is going to be scheduled for the UE so it can go to sleep till the next ON duration, and so on. Cross-slot scheduling refers to a technique whereby a scheduling message in a PDCCH schedules the UE to receive data in a later slot or subframe, as opposed to the same slot in which the scheduling message appears. This allows for extra micro-sleep opportunities. Furthermore, the UE may be configured with non-zero K0 and K2 values in RRC reconfiguration indicating to the UE that a cross-scheduling is expected.

All of these additional techniques provide further opportunities for reducing power consumption by the UE, and may be used in conjunction with C-DRX or other DRX mechanisms. Depending on the length of sleep opportunity, different sleep modes, e.g. micro, light and deep sleep may be considered for any of the sleep opportunities that are afforded by these techniques.

Notably, h the default situation discussed above, i.e., where the UE always transitions into its deepest sleep mode when transitioning into the C-DRX OFF state," may not necessary be the optimal solution in terms of power consumption and sometimes not even possible. For example, if a WUS and the associated paging monitoring end too close to a subsequent C-DRX ON duration, the UE may not be able to go back to deep sleep due to transition time constraints. Or, when the UE is in the C-DRX OFF duration, it may have to perform some periodic measurements and thus need to wake up, such that the resulting sleep period is too short for deep sleep to be effective. For example, if the synchronization signal block (SSB) measurement periodicity is short, or SSB measurement occasion is very close to the next ON duration, or right after UE goes to C-DRX OFF duration, the UE may not be able to go to deep sleep, or to another preferred sleep state. The same holds for the case of RRC_Idle/inactive, where the UE needs to wake-up for SSB measurements as well as paging monitoring during a paging occasion (PO).

Described herein are methods and mechanisms for the UE to adapt its sleep mode beyond the default mode based on a specific operation timeline or based on received power saving triggers. Using these techniques, a UE may choose the optimal sleep mode under any of a variety of circumstances, e.g., during C-DRX OFF duration, during the active time, and in RRC_Idle/Inactive states, considering existing and anticipated NR signal structures and signaling mechanisms.

The selection of a sleep mode for any given sleep opportunity may be based on, on the one hand, on required measurement and monitoring operations and power saving triggers received (e.g., WUS, cross-slot scheduling indication, PDCCH skipping, etc.), and on the other hand, transition times and transition energies associated with entering and exiting different available sleep modes and the ability to maintain tuning parameters in those modes. In some embodiments or instances, the UE may advance or reschedule the sequence and timing of monitoring or measurement operations to obtain more efficient sleep patterns, if permitted by the reception scenarios.

The principle behind sleep mode is that overall UE power consumption may be substantially reduced if, when a hardware circuit in the UE is not in use, it is powered off or configured into a low-power mode. Depending on the number and extent of hardware circuits that can be configured into power-off or low power mode, there might be two, three, or more UE sleep modes, with each having a different depth of sleep, i.e., a different degree of reduced energy consumption by the UE, relative to a non-sleep ("awake") mode in which all of the circuits are active. For instance, a UE might have three sleep modes, as follows:

Deep sleep: The UE turns off power to the majority of its systems/circuits, e.g., radio-frequency (RF) circuits and baseband modem. Its control processor is kept in very low power mode and the external memory (SDRAM) in self-refresh mode. Generally, the UE also stops its system clock (e.g., 30 MHz) and keeps a low-frequency (e.g., 32 kHz) real time clock.

Light sleep: UE keeps the system clock running while its RF circuits are powered OFF. The baseband modem is powered but most of the baseband is normally clock gated. Its control processor is active and the external memory is also active.

Micro-sleep: All systems/circuits in the UE are powered ON and active, but RF is powered OFF. In general, some portion of baseband modem can also be clock gated.

Generally, the deeper the sleep, the less the power consumed by the UE. However, the UE consumes power during the transitions into or out of a sleep mode—these transitions also have latency, which affect how quickly the benefits from the reduced power consumption begin to accrue. Furthermore, the power and latency overheads for the transitions into and out of sleep may tend to be larger for transitions into deeper sleep modes. In 3GPP, a UE power model has been adopted where the power level in relative units in deep, light, and micro sleep are 1, 20, and 45 units respectively. The required time for UE deep sleep transition (into and out of sleep) is agreed as 20 milliseconds (ms) with a corresponding energy consumption of 450 unit·ms, while the required time for light sleep transition (into and out of sleep) is agreed as 6 ms, with a corresponding energy consumption of 100 unit·ms. This model, which should be regarded as simply an example, allows the overall power consumption of different sleep modes to be compared to each other, for any specific length of sleep.

The candidate sleep modes described above have certain associated costs for entering and exiting the modes, at least in terms of transition time and transition energy, as discussed above. Another constraint on sleep mode operation that should be considered is tuning parameter retention, e.g., the UE's ability to maintain time and/or frequency synchronization or to maintain appropriate automatic gain control (AGC) settings for amplifiers across a sleep interval in which measurement inputs for tuning these settings are restricted.

As an example of these costs, in the 3GPP UE power model discussed above, transition into deep sleep and out of deep sleep is assumed to take 10 ms (in each direction). This transition leads to a total of 450 units of energy×ms. Similarly, transition into light sleep and out of light sleep is assumed to take 3 ms (each direction) and this leads to a total of 100 units of energy×ms.

When determining a suitable sleep mode, a UE or other wireless device may consider both the required transition time and the additional transition energy consumed. Thus, the UE may implement the evaluation of the optimal sleep modes as well as the related timeline in its control processor. Clearly, if the time available for sleeping is insufficient to enter and exit a preferred sleep mode, an alternative, less deep sleep mode needs to be considered. Additionally, if the total energy cost of performing the transition into a certain deeper sleep mode exceeds the energy saved, the transition should not be performed, or an alternative (less deep) sleep mode should be considered. For example, if the available time is on the order of 20 ms, the transition energy to deep sleep under the model discussed above exceeds the baseline energy saved compared to remaining in light sleep. In such a case light sleep may be selected.

Another constraint for sleep mode selection and switching is the ability to efficiently resume operation after returning from sleep, based on retaining relevant tuning parameters during the sleep phase. The UE may have obtained, e.g., AGC and/or time/frequency synchronization information from previous measurements of synchronization signal blocks (SSBs), demodulation reference signals (DMRS), channel-state information reference signals (CSI-RS), etc. The UE's ability to accurately maintain the sync and other tuning parameters may be strongly impaired during lower-power operation, e.g., because of operating the LO and internal clocks in a coarse mode and because of temperature changes in the UE. Therefore, an expected loss of tuning info and the accuracy of available information at the time of wake-up may be considered by the UE when selecting an appropriate sleep mode. This evaluation may take into account that the UE's required operational capability, e.g., the accuracy of the sync and/or AGC upon waking up from sleep, may depend on the specific operations that are anticipated after wake-up. If immediate PDCCH monitoring is required after waking up, for example, then deep sleep may not be permitted, with the UE instead resorting to light sleep instead. If the first expected operation is a SSB measurement, on the other hand, the UE may anticipate that tuning info can be re-acquired at that time, such that deep sleep may be permitted.

Further additional costs for mode switching may be considered in terms of operational complexity, e.g., taking into account the coordination and cooperation required between different stages of UE HW and UE power management to impose the different sleep modes. Such costs are implementation-dependent and may be expressed qualitatively or quantitatively at the time of design.

Thus, for instance, an example UE may be configured with a C-DRX configuration, including an ON duration, inactivity time (IAT) timer, and C-DRX OFF duration. Upon the expiry of IAT, or if the UE does not receive a scheduling downlink control information (DCI) during ON duration, the UE moves to the sleep period until the next ON duration. Additionally, the UE may move to the C-DRX OFF duration because of a received medium access control (MAC) DRX command or a received go-to-sleep (GTS) signal. Each instance where the UE enters sleep or changes sleep mode may be referred to as a "sleep opportunity."

In one approach according to some of the techniques described herein, the UE may choose a sleep mode (e.g., micro, light or deep mode) for a given sleep opportunity based on the duration of the C-DRX OFF state and the upcoming periodic measurements or WUS/GTS measurement opportunities, as well as based on the transition time and energy needed to move in and out of the available sleep modes. For example, if the OFF duration is small (e.g., only a few milliseconds), then the UE (e.g., through its control processor) may decide to enter micro or light sleep (e.g., stop the RF clock, or turn of the whole RF circuitry), so that it can wake up more quickly for the next ON duration or WUS/GTS MO. But if the OFF duration is long (e.g., tens of milliseconds), then the UE may decide to go to deep sleep (e.g., turn off the clock, RF circuitry and most parts of baseband processing except the control processor). Here again, e.g., the UE can evaluate whether, if it goes to the deep sleep, it will have sufficient time to wake up for the possible periodic measurement events and whether other switching constraints are satisfied.

In some embodiments, the UE may further optimize the sleep pattern by performing certain operations at time instances when their energy consumption impact, e.g., due to impeding deeper sleep modes, is minimal. For example, the UE may be able to sleep for 160 ms, but the next SSB measurement is in 10 ms, and hence the UE may decide to first go to light sleep, wake-up for SSB measurement, and then go to deep sleep, if the SSB measurement periodicity is long enough. Alternatively, the UE may decide to immediately go to deep sleep and skip the SSB measurement occasion if it does not expect the channel conditions to change significantly or if it anticipates that there are other SSB measurements opportunities coming its way and thus it can do the measurements in those occasions.

In another embodiment, the UE may optimize the sleep pattern by performing certain operations at different voltage-frequency operating points (e.g., UE can lower its supply voltage and run the operation with a lower frequency) to minimize the energy consumption. For example, the UE is scheduled to receive a physical downlink control channel (PDCCH) and/or physical downlink shared channel (PDSCH) in one slot. Following that, there is an SSB measurement scheduled for 21 milliseconds out. Instead of decoding PDCCH/PDSCH in one slot and going to deep sleep and waking up again for SSB reception, the UE might decode PDCCH/PDSCH with a lower supply voltage and/or lower frequency. With this approach, the PDCCH/PDSCH processing timeline is slower, but power consumption can be dramatically reduced. Then, the UE can go to light sleep (instead of deep sleep, since the remaining time margin may not be sufficient for deep sleep). The total UE energy consumption for this particular sleep opportunity may still be less than the former case, where the UE processes the PDCCH/PDSCH in a normal operating mode and then enters sleep.

In another scenario, a UE may be configured with a WUS/GTS measurement before the next C-DRX ON duration, such that the UE is then expected to wake-up to monitor WUS/GTS. If this measurement opportunity is close to the ON duration and a WUS is received meaning the UE should wake up for the next ON duration, for example, then the UE should evaluate if it has opportunity for a deep sleep, or otherwise has to adapt its sleep mode to light or micro sleep, depending on the available time.

The same procedures can be applied to the case where the UE is in or moving into the RRC_Idle/Inactive state, where the default is that the UE moves to the deep sleep. Here, again the UE has to wake up from time to time, either for periodic SSB measurements or to monitor paging messages. Assuming the UE is in deep sleep and wakes up for SSB measurements, however, if the next paging measurement opportunity is close (e.g., only a few milliseconds away), then the UE might choose to first go to light sleep and then wake-up to monitor the paging measurement opportunity, and then if not paged, go back to deep sleep. Here, again the UE may decide to skip some of the SSB measurements and stay in deep sleep, in the event that it does not expect much of a change in the channel conditions, e.g., the suitable AGC setting. This decision may be based on previous recent observations with respect to the channel conditions and/or the AGC stability.

Figure 2:
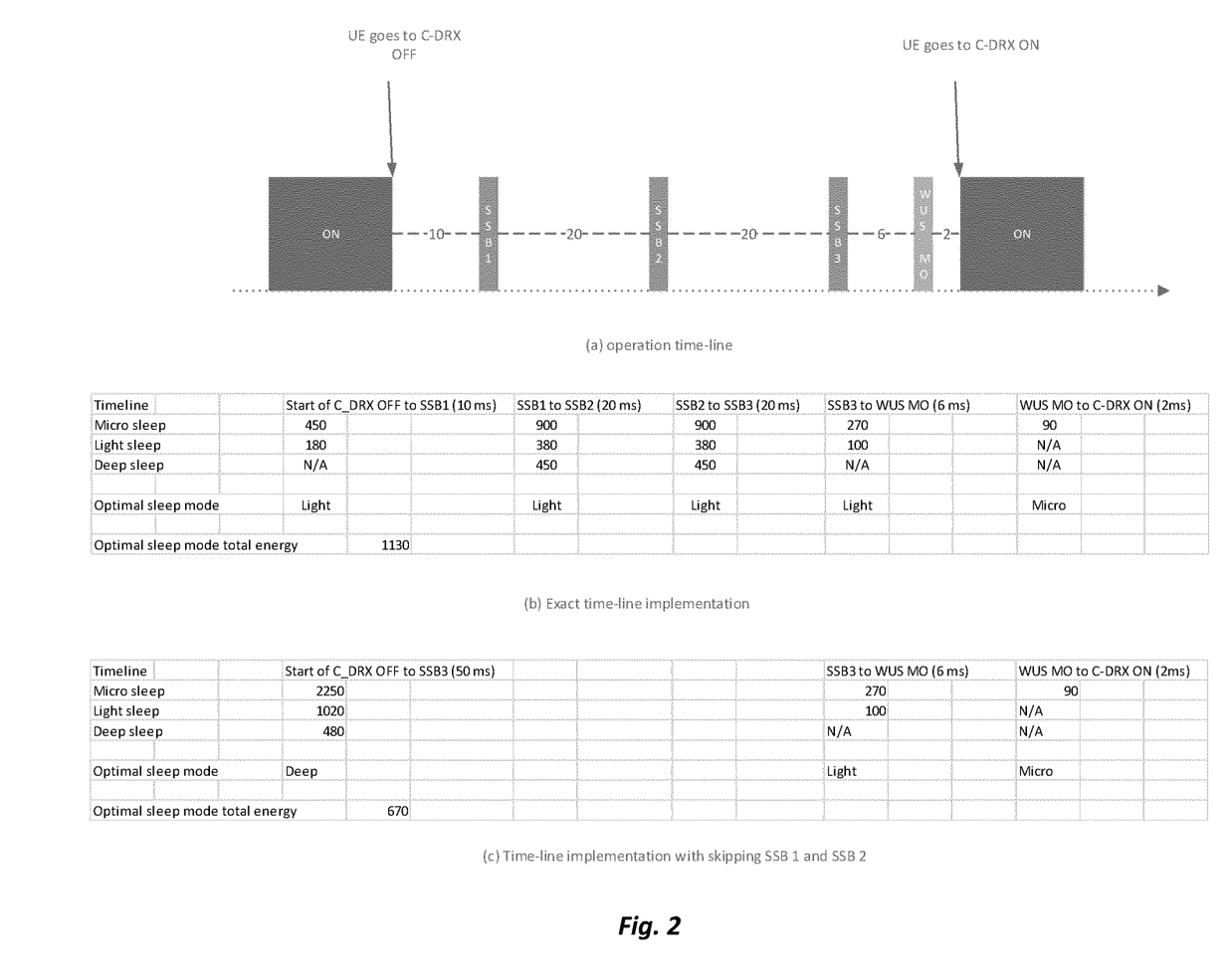
FIG. 2 illustrates an example scenario including multiple sleep opportunities.

FIG. 2 depicts an example of how the UE control processor, which may be referred to interchangeably as "processing circuitry," can decide about the implementation of sleep modes, as well as their adaptation, and optimal mode selection. Section (a) of FIG. 2 illustrates an example time-line of expected operations in an example C-DRX OFF duration. A typical assumption is that since the C-DRX OFF duration is 58 ms, then there is enough time to go to deep sleep. In this scenario, however, the UE needs to wake up to monitor WUS after 56 ms. Still, the UE could theoretically go to deep sleep for 56 ms. But, if the channel conditions change during the OFF duration, the UE may not be able to reliably detect the WUS and might even lose its connection. Thus, the UE may decide to either perform SSB measurements in all the SSB instances, as shown in the sequence of events modeled in section (b) of FIG. 2, or, in the event that the channel conditions are rather stable and no large change is expected, the UE may choose to skip SSB 1 and SSB 2 and wake up for SSB 3 immediately before WUS MO, as modeled in section (c) of FIG. 2.

In each of the UE implementation examples shown in sections (b) and (c), the UE has to decide which sleep mode to enable for each sleep opportunity. As such the control processor can first note if a specific sleep mode implementation is possible for a given sleep opportunity and, if so, then what is the associated energy consumption.

In the scenario shown in section (b) of FIG. 2, there are five distinct sleep opportunities. For the first one, between the start of the OFF state and the SSB measurement event labeled "SSB1," the UE cannot go to deep sleep mode, as there is insufficient transit time for deep sleep mode. Thus, the evaluation table shown in section (b) includes an "N/A," for "not applicable," next to the "deep sleep" option. The same holds for both light sleep and deep sleep modes for the last sleep opportunity, between the WUS measurement opportunity and the start of the ON duration, as the two milliseconds in that sleep opportunity is not sufficient time for the UE to go to either of these modes and be able to wake up on time for the next operation.

For each sleep mode that is feasible for a given sleep opportunity, the UE's processing circuitry can evaluate energy-related parameters for that sleep mode, e.g., taking into account transition times, transition energies, and power consumption between the transitions into and out of the sleep mode, and calculate an energy/power cost or metric. Examples are shown in section (b) of FIG. 2, where, for instance, the costs for micro sleep, light sleep, and deep sleep for the second sleep opportunity (between SSB1 and SSB2) are calculated as 900, 380, and 450 milliseconds. This example shows that the deep sleep mode may not always have the lowest cost, even when feasible, because of (for example) the transition times and transition energies associated with entering and exiting the sleep mode. Thus, after the processing circuitry of a wireless device has evaluated the energy-related parameters, e.g., by constructing an example table like that shown in section (b) of FIG. 2, it can choose the optimal sleep mode in each time offset such that it achieves the lower possible energy. It can be seen that in this example, although there is sufficient time to go to deep sleep between SSB1 and SSB2, as well as between SSB2 and SSB3, since the associated transition energy is high, light sleep is the optimal choice. In the final sleep opportunity, between the WUS measurement opportunity and the "ON" interval of the C-DRX cycle, the optimal sleep mode is the only feasible one under the assumptions here, i.e., the "micro" sleep mode.

Alternatively, in some embodiments or instances, a wireless device may choose to implement a time-line as shown in section (c) of FIG. 2, i.e., skipping the measurements associated with SSB1 and SSB2. In this case, as shown in the table illustrated in section (c) of FIG. 2, there are only three sleep opportunities, i.e., from C-DRX OFF to SSB3, from SSB3 to WUS measurement opportunity (MO), and from WUS MO to C-DRX ON. Here, the optimal sleep modes for these three sleep opportunities are deep, light, and micro, respectively, compared to the sequence of light, light, light, light, and micro sleep modes shown in section (b) of FIG. 2. Note that the "total" energy metric for this second scenario is only 670, compared to 1130 for the first scenario—this illustrates the energy savings that may be available if the UE is permitted to adjust its operations, here by skipping measurements associated with SSB1 and SSB2. Thus, in addition to evaluating energy-related parameters for each of several modes, before entering a particular sleep opportunity, the wireless device may also evaluate and compare different patterns of sleep opportunities that are enabled by adjusting device operations, e.g., by moving or omitting certain operations. As seen in the example discussed above, these different patterns may have different numbers of sleep opportunities within a given DRX cycle, for instance, as a result of omitting one or more measurements or some other adjustment of wireless device operations.

In some embodiments or instances, a wireless device may take other energy savings opportunities into account. For instance, assume that a UE is in active time, e.g., it is either in an ON duration or IAT of C-DRX, or is monitoring PDCCH with a specific CORESET/SS configuration and periodicity.

The UE can meanwhile receive an explicit or implicit power saving indication, such as a cross-slot scheduling indication, a PDCCH skipping command, a PDCCH monitoring periodicity adaptation, or the like. Accordingly, the UE may thus become aware that it does not need to monitor PDCCH for a given time duration or a number of slots. Therefore, there is an opportunity for the UE to choose an optimal sleep mode for its next sleep opportunity and/or to adapt sleep opportunities and sleep modes for power savings.

For instance, if the UE receives an indication that it is to be scheduled in the cross-slot mode, the UE knows that there is a specific number of slots delay between the scheduling PDCCH and the corresponding PDSCH/PUSCH/PUCCH (Physical Downlink/Uplink Shared/Control Channel). The default assumption might be that the UE can go to micro sleep during this interval, so that it can wake up rapidly for the scheduled event. However, if the time offset between PDCCH till PDSCH is long enough, and if the UE does not need to monitor PDCCH in the meantime, e.g., for a period of more than 6 milliseconds, then the UE can choose a deeper sleep mode, such as light sleep, if the associated energy consumption (including the transition energy) is lower than that for micro sleep. Alternatively, in the event that the UE is scheduled with cross-slot mode but the PDCCH comes at the end of the current slot (in Rel 15 NR, the PDCCH can potentially come any time in a slot), and the next scheduled event, e.g., PDSCH, starts immediately in the next slot (e.g., after a couple of micro seconds), the UE may not have sufficient time to go to any sleep mode and it may choose to stay awake.

In another example, the UE may have received an indication or otherwise determine that it does not need to monitor PDCCH for a specific time period. This may arise from the receipt of a PDCCH-skipping indication or an increase in the monitoring periodicity. The default sleep mode in this case may be for the UE to go to light sleep (if the PDCCH skipping period is, e.g., more than 6 ms). Nevertheless, if the next periodic reporting instance (e.g., CSI report or sounding reference signal (SRS transmission) for the UE is very close (e.g., in 2 ms), the UE may first decide to go to micro sleep mode and then to light sleep after the reporting instance, if the time allows and the associated energy consumption is lower, or if there is not enough transition time, remain in micro sleep for all the time. Or, if the duration during which the UE does not need to monitor PDCCH or report CSI is long enough, it may even decide to go to deep sleep, for example if the PDCCH skipping entails more than 20 ms and the associated energy consumption is lower than the other modes including the transient energy consumption.

In some embodiments or instances, a UE may adapt its sleep modes according to the time latency requirement of an application running in a UE as well as the associated energy consumption of each mode. Based on Quality of service (QoS) parameters, for example, a UE may know that a running application may have a strict requirement on time latency. In this case, the UE may choose to avoid deep sleep mode even if the duration during which it does not have to monitor PDCCH is long enough (e.g., more than 20 ms) but the UE expects to transmit some data (e.g., send a scheduling request (SR), and thus it either chooses to move to light or micro sleep for a given sleep opportunity instead. This evaluation may consider when and for how long the UE expects to transmit, as well as transient times into and out of each of several possible sleep modes, so that the UE can choose the sleep mode with the lowest associated energy consumption.

For example, the UE may determine that it can perform PDCCH skipping for 20 ms, such that any of the sleep modes are feasible. The associated energy consumptions, when accounting for transition times, transition energies, and sleep duration, may then be 900 for micro sleep, 380 for light, and 450 for the deep sleep mode. In this case, the UE may choose the light sleep mode (because considering the transient energy, this mode has the lower energy consumption compared to the others and even deep sleep mode). In a related example, the UE may receive a PDCCH skipping command for 20 ms, but it may be aware that after 4 ms, it has to transmit SRS resources. In this situation, the time-line becomes 4 ms till SRS, and then 15 ms till the next PDCCH MO, assuming SRS transmission takes 1 ms. The UE won't be able to go to deep sleep mode in either of these two sleep opportunities, considering the insufficient transition time for deep sleep (lower than 20 ms). Furthermore, in the first instance, the UE cannot go to light sleep, since the transition time is 4 ms, which is lower than the required 6 ms in our example. Accordingly, in the first instance, the UE goes to micro sleep. However, in the second instance it can go to either micro or light sleep. The associated energy consumptions for these sleep modes for this sleep opportunity are 670 for micro sleep and 280 for light sleep. Therefore, the UE chooses the light sleep for the second sleep opportunity. Again, if the UE expects that it may need to send an uplink transmission within this 15 ms, e.g., a scheduling request (SR), then it might not choose light sleep even if it has the lowest energy consumption, and just go to micro sleep, so that it can rapidly wake up for uplink transmissions if needed.

In the examples discussed above, it was generally assumed that the power saving mechanisms are indicated on or pertain to a single cell or to a primary cell (PCell) in a multi-carrier scenario. However, it will be appreciated that the same mechanisms can be readily applied to scenarios where one or more Scells are active and/or scheduled for the UE. The power saving mechanisms might apply to each Scell individually, or to a group of them if the power saving mechanism applies to all.

Figure 3:
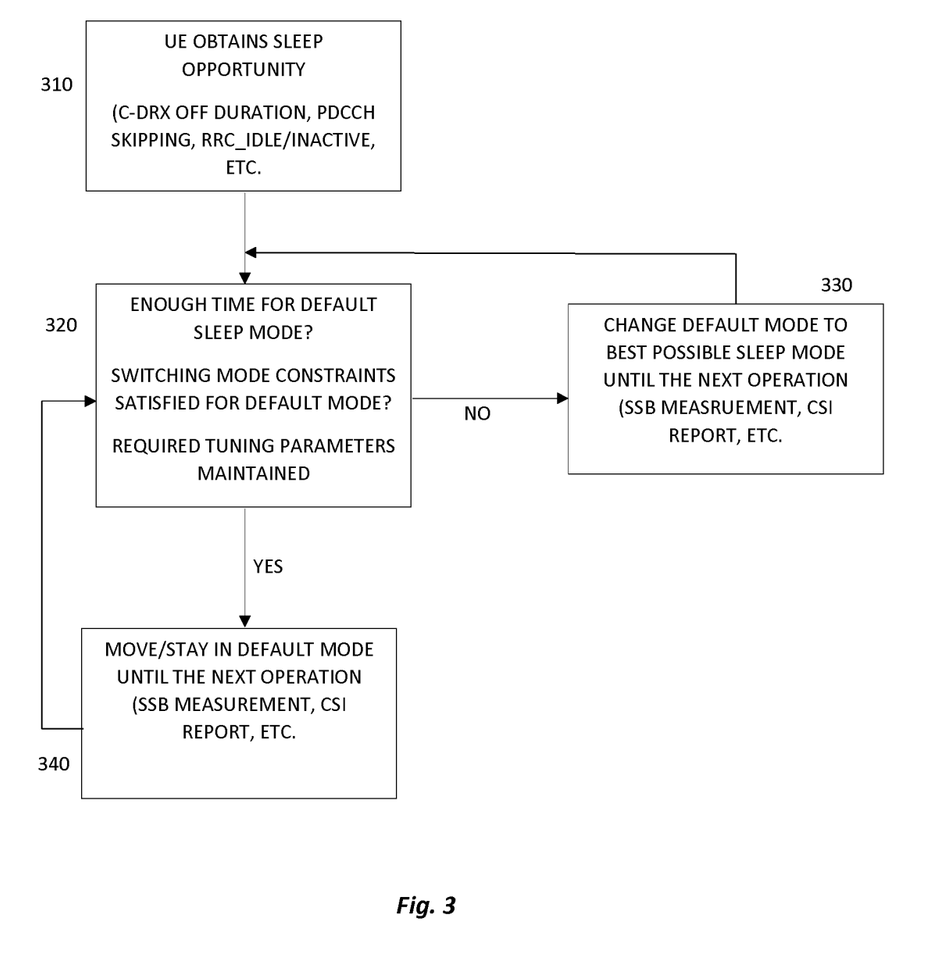
FIG. 3 is a process flow diagram illustrating an example method according to some embodiments of the presently disclosed techniques.

In view of the details and examples provided above, it will be appreciated that FIG. 3 illustrates a flow chart for an example method carried out by a wireless device, such as a UE. The method begins, as shown at block 310, with the UE obtaining a sleep opportunity, i.e., determining that a sleep opportunity is imminent. This sleep opportunity may result from the beginning of a C-DRX OFF duration, for example, or be triggered by a GTS signal, and/or may involve PDCCH skipping and/or one or more other power-savings mechanisms.

The method continues, as shown at block 320, with an evaluation of the possible sleep modes for the sleep opportunity. This includes an evaluation of certain conditions, for example, such as whether there is enough time for a default sleep mode or other sleep modes. This may also involve evaluating whether the constraints associated with switching modes, e.g., the transition times into and out of the sleep mode are satisfied, as well as whether certain tuning parameters, such as those pertaining to time and/or frequency synchronization and/or to automatic gain control settings, can be maintained adequately, e.g., in view of anticipated operations upon awaking from sleep. This evaluation also includes a consideration of energy-related parameters for each of one or several of the sleep modes, to determine or estimate which of the feasible sleep modes will yield the lowest energy consumption.

In the example process shown in FIG. 3, it is assumed that the "default mode" is the deepest sleep mode, or the deepest sleep mode applicable to the relevant type or category of sleep opportunity. Thus, if it is determined that there is sufficient time for this default mode, and that switching mode constraints and/or other constraints are satisfied with a transition to the default mode, then the UE moves into or stays in the default mode till the next operation for which the UE needs to be awake. This is shown at block 340. If the default mode does not satisfy all the necessary constraints, the UE instead selects and activates an alternative sleep mode until the next UE event, as shown at block 330. Here, if there are multiple possibilities that are feasible, given the constraints, the UE selects the one that yields the best power savings, given the consideration of energy-related parameters for the modes.

Figure 4:
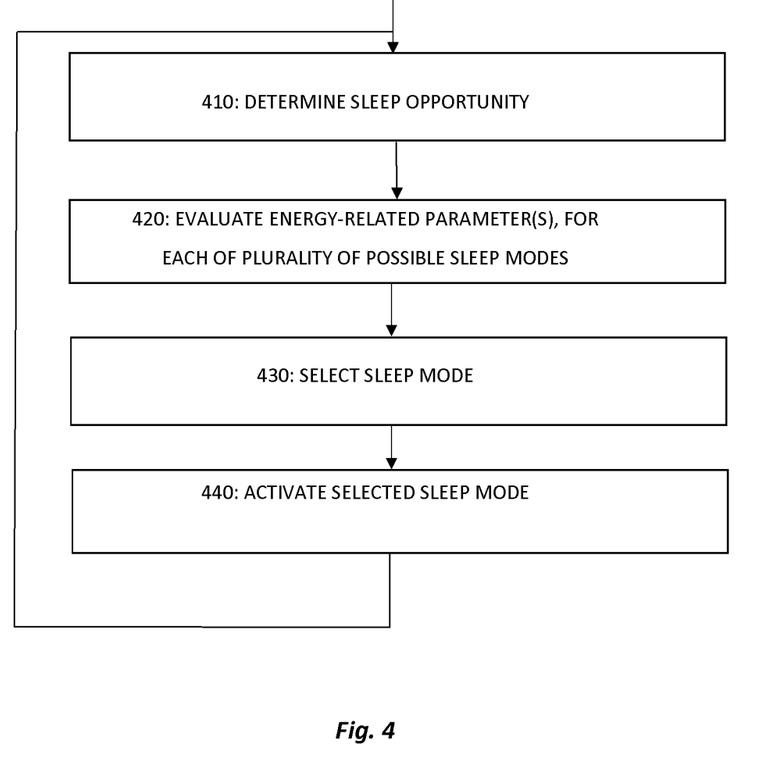
FIG. 4 is a process flow diagram illustrating another example method according to some embodiments.

FIG. 4 illustrates a process flow diagram representing another example method according to several embodiments of the techniques described herein, again as carried out by a wireless device, such as a UE. The wireless device may be a cellular phone, a smartphone, a machine-to-machine (M2M) device, an internet-of-things (IoT) device, a wireless-equipped computer, or the like. This method, like the methods shown in FIG. 3 and FIG. 5, may vary according to any of the several variations described in the examples provided above.

As shown at block 410 of FIG. 4, the method begins with determining a first sleep opportunity for the wireless device. Again, this sleep opportunity may arise from a transition into a DRX "OFF" interval, or from a return to "OFF" from a measurement opportunity or uplink transmission, or be triggered by one of the several power-savings mechanisms discussed above, in various instances. The method continues, as shown at block 420, with the evaluation of one or more energy-related parameters for each of a plurality of possible sleep modes for the wireless device, where the plurality of possible sleep modes correspond to varying degrees of reduced energy consumption by the wireless device, relative to a non-sleep mode. These possible sleep modes might correspond to the "deep sleep," "light sleep," and "micro sleep" modes discussed above, for instance. The energy-related parameters may include, for example, transition times into and out of the sleep mode, transition energies associated with transitioning into and out of the sleep mode, and/or power consumption while in the sleep mode, e.g., between the transitions.

As shown at block 430, the illustrated method continues with the selection of a first one of the plurality of possible sleep modes for the wireless device, based on said evaluating. As shown at block 440, the selected sleep mode is then activated, during the first sleep opportunity.

As discussed above, the plurality of possible sleep modes may include a deep sleep mode, a light sleep mode, and a micro sleep mode, in some embodiments. More generally, the plurality of sleep modes may comprise a first sleep mode, in which radio circuitry is inactivated and processing circuitry is in a lowest power mode, and a lighter-sleep mode, in which processing circuitry is in a higher power mode, relative to the lowest power mode. There may, of course, be multiple lighter-sleep modes, with varying levels of power consumption. In some embodiments, the evaluation shown in block 420 comprises determining that an upcoming measurement or upcoming transmission or upcoming broadcast signal reception is planned at a time such that use of this first sleep mode is not possible or would require more overall energy consumption than using the lighter-sleep mode, given the one or more energy-related parameters for each sleep mode, in which case the selecting step comprises selecting the lighter-sleep mode, responsive to this determination. In other embodiments and/or instances, the sleep opportunity may follow a wake-up signal, and the evaluation may comprise determining that an upcoming on-interval of a discontinuous reception, DRX, cycle is planned at a time such that use of the first sleep mode is not possible or would require more overall energy consumption than using the lighter-sleep mode, given the one or more energy-related parameters. In this case, the selecting shown in block 430 may comprise selecting the lighter-sleep mode, responsive to this determination.

As mentioned above, in any of these embodiments, the one or more energy-related parameters may comprise any one or more of any of: a transition time into or out of one of the plurality of possible sleep modes; and a power or energy consumption during a transition into or out of one of the plurality of possible sleep modes. Other parameters may be considered as well. In some embodiments, the evaluation may consider one or more constraints on the sleep opportunity, these one or more constraints comprising any one or more of any of: an effect of one of the plurality of possible sleep modes on an accuracy of time or frequency synchronization to a network signal; or an effect of one of the plurality of possible sleep modes on an accuracy of automatic gain control tuning. Likewise, in these or in other embodiments or instances, the evaluation may consider one or more constraints comprising any one or more of any of: an upcoming measurement event; an upcoming wake-up signal monitoring opportunity; a type of operation required of the wireless device upon waking up after the sleep opportunity; and a latency requirement for an application executing on the wireless device. Other constraints may be considered as well, or instead of one or more of those discussed above.

In some embodiments or instances, the evaluation illustrated in block 420 may include a consideration of one or more of any of: a cross-slot scheduling indication; a physical downlink control channel, PDCCH, skipping command; an adaptation of a PDCCH monitoring period; a go-to-sleep signal; a Medium Access Control (MAC) discontinuous-reception (DRX) command; a reconfiguration of a number of layers; an antenna adaptation command; a search space; and a CORESET adaptation.

In some embodiments, the method may further comprise adjusting a planned timing of one or more receiver monitoring or measurement operations and/or omitting one or more receiver monitoring or measurement operations, based on the evaluation shown in block 420. This may result in a different duration for the sleep opportunity, for instance, or in the substitution of one longer sleep opportunity for two or more shorter sleep opportunities, as discussed in the examples above (e.g., in connection with FIG. 2).

The method shown in FIG. 4 may be repeated, for subsequent opportunities. Thus, for example, the illustrated method may repeat the step shown in block 410, such that the wireless device determines a second sleep opportunity for the wireless device. This may be within the same DRX cycle for the wireless device, for instance, e.g., as seen with the second through fifth sleep opportunities illustrated in FIG. 2. The method may continue with performing a second evaluation of one or more energy-related parameters for each of the plurality of possible sleep modes for the wireless device, for this second sleep opportunity, e.g., as shown at block 420 of FIG. 4. The method in these embodiments/instances may continue, as shown at block 430, with selecting a second one of the plurality of possible sleep modes for the wireless device, based on said performing the second evaluation. This second selected sleep mode may or may not differ from the first selected sleep mode, depending on the circumstances. Then, the wireless device activates the second one of the plurality of sleep modes during the second sleep opportunity, as shown at block 440.

Figure 5:
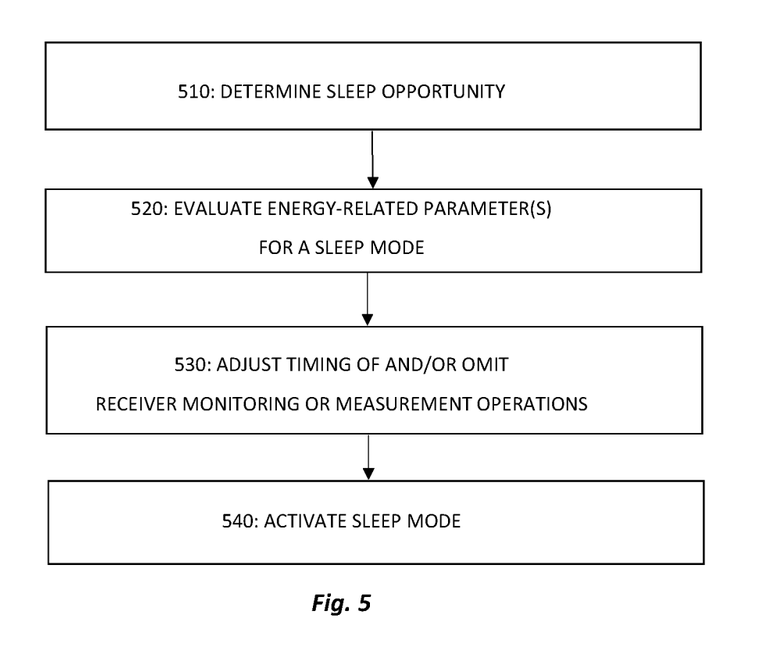
FIG. 5 is a process flow diagram illustrating still another example method according to some embodiments.

FIG. 5 illustrates a process flow diagram representing another example method according to several embodiments of the techniques described herein, again as carried out by a wireless device, such as a UE. Again, the wireless device may be a cellular phone, a smartphone, a machine-to-machine (M2M) device, an internet-of-things (IoT) device, a wireless-equipped computer, or the like. This method may complement or replace one or more of the other techniques described herein. As shown at block 510, this method begins with determining a sleep opportunity for the wireless device. Once again, this sleep opportunity may arise from a transition into a DRX "OFF" interval, or from a return to "OFF" from a measurement opportunity or uplink transmission, or be triggered by one of the several power-savings mechanisms discussed above, in various instances. The method continues, as shown at block 520, with the evaluation of one or more energy-related parameters for (at least) one sleep mode for the wireless device, where this sleep mode corresponds to a state of reduced energy consumption by the wireless device, relative to a non-sleep mode. These one or more energy-related parameters may include any of those discussed above, for example, such as a transition time into or out of the sleep mode, and/or a power or energy consumption during a transition into or out of the sleep mode.

The example method continues, as shown at block 530, with the wireless device adjusting a planned timing of one or more receiver monitoring or measurement operations and/or omitting one or more receiver monitoring or measurement operations, based on this evaluation. As shown at block 540, the method further comprises activating the sleep mode.

As was the case with the method illustrated in FIG. 4, the evaluating shown in block 520 may comprise considering one or more constraints on the sleep opportunity, the one or more constraints comprising any one or more of any of: an upcoming measurement event; an upcoming wake-up signal monitoring opportunity; an effect of the sleep mode on an accuracy of time or frequency synchronization to a network signal; an effect of the sleep mode on an accuracy of automatic gain control tuning; a type of operation required of the wireless device upon waking up after the sleep opportunity; and a latency requirement for an application executing on the wireless device.

The methods herein and any other processing may be implemented in a wireless device, such as a UE, using any of a variety of functional means, modules, units, or circuitry. In one embodiment, for example, a wireless device or apparatus comprises respective circuits or circuitry configured to perform the steps shown in either or both of the methods illustrated in FIGS. 3, 4 and FIG. 5. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 6:
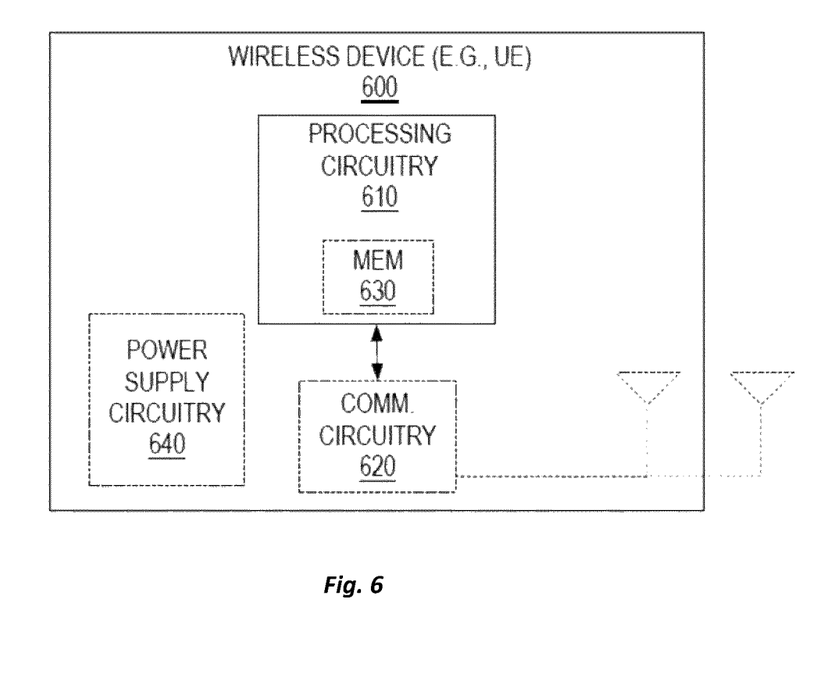
FIG. 6 is a block diagram illustrating an example wireless device apparatus, according to some embodiments.

FIG. 6 for example illustrates a wireless device 600 as implemented in accordance with one or more embodiments. As shown, the wireless device 600 includes processing circuitry 610 and radio circuitry 620. The radio circuitry 620 is generally configured to transmit and/or receive information to and/or from one or more other radio nodes and may be more particularly configured to communicate with a wireless communication network, such as an NR and/or LTE network, via one or more appropriate wireless communication technologies and/or standards. Such communication may occur via one or more antennas that are either internal or external to the wireless device 600. The radio circuitry 620 may, for instance, include receiver and/or transmitter circuitry, all or portions of which may be inactivated and/or put into a low-power state in one or in each of several sleep modes. The processing circuitry 610 is operatively coupled to radio circuitry 620 and is configured to control the radio circuitry 620, as well as to perform processing described above (e.g., in FIGS. 4 and 5), such as by executing instructions stored in memory 630. The processing circuitry 610 in this regard may implement certain functional means, units, or modules. The wireless device 600 in some embodiments also includes power supply circuitry 640 for supplying power to the wireless device 600.

Wireless device 600 may, in various embodiments, be adapted to carry out any of the methods described herein. Thus, for example, the processing circuitry 610 may be configured to determine a sleep opportunity for the wireless device, as shown in block 410 of FIG. 4, to evaluate one or more energy-related parameters for a sleep mode for the wireless device as shown in block 420, the sleep mode corresponding to a state of reduced energy consumption by the wireless device, relative to a non-sleep mode, to adjust a planned timing of one or more receiver monitoring or measurement operations and/or omit one or more receiver monitoring or measurement operations as shown in block 430 of FIG. 4, based on said evaluating, and to activate the sleep mode, as shown at block 440 of FIG. 4. The processing circuitry 610 may be configured to carry out any of the variations of the method shown in FIG. 4, discussed above, as well as any other variations suggested by the various examples and descriptions herein.

Likewise, the processing circuitry 610 may instead or additionally be configured to determine a sleep opportunity for the wireless device, as shown at block 510 of FIG. 5, to evaluate one or more energy-related parameters for a sleep mode for the wireless device as shown at block 520, where the sleep mode corresponds to a state of reduced energy consumption by the wireless device, relative to a non-sleep mode, to adjust a planned timing of one or more receiver monitoring or measurement operations and/or to omit one or more receiver monitoring or measurement operations as shown at block 530 of FIG. 5, based on said evaluating, and to activate the sleep mode, as shown at block 540 of FIG. 5. The processing circuitry 610 may be configured to carry out any of the variations of the method shown in FIG. 5, discussed above, as well as any other variations suggested by the various examples and descriptions herein.

Other embodiments include computer program products comprising computer program instructions for execution by a processing circuit in a wireless device, such as by processing circuit 610 in wireless device 600, where these program instructions are configured to cause the wireless device to carry out a method like that illustrated in FIG. 4 or FIG. 5, as well as any variations thereof. Still other embodiments include computer-readable medium, such as memory 630 of wireless device 600, that comprise such a computer program product.

Those skilled in the art will appreciate that terms such as "first", "second", and the like, as used herein, are generally used merely to distinguish between various elements, regions, sections, etc., and not necessarily to indicate a particular order or priority. As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise. Like terms refer to like elements throughout the description.

With the above range of variations and applications in mind, it should be understood that the present invention is not limited by the foregoing description, nor is it limited by the accompanying drawings. Instead, the present invention is limited only by the following claims, and their legal equivalents.

The invention claimed is:

1. A method of controlling a wireless device, the method comprising:
determining a first sleep opportunity for the wireless device;
evaluating one or more energy-related parameters for each of a plurality of possible sleep modes for the wireless device, the plurality of possible sleep modes corresponding to varying degrees of reduced energy consumption by the wireless device, relative to a non-sleep mode;
selecting a first one of the plurality of possible sleep modes for the wireless device, based on said evaluating;
activating the selected sleep mode during the first sleep opportunity;
determining a second sleep opportunity for the wireless device, within a same discontinuous-receive (DRX) cycle for the wireless device;
performing a second evaluation of one or more energy-related parameters for each of the plurality of possible sleep modes for the wireless device;
selecting a second one of the plurality of possible sleep modes for the wireless device, based on said performing the second evaluation, the second one of the plurality of possible sleep modes differing from the first one of the plurality of possible sleep modes; and
activating the second one of the plurality of sleep modes during the second sleep opportunity.

2. The method of claim 1, wherein the plurality of possible sleep modes comprises a first sleep mode, in which radio circuitry is inactivated and processing circuitry is in a lowest power mode, and a lighter-sleep mode, in which processing circuitry is in a higher power mode, relative to the lowest power mode.

3. The method of claim 2, wherein said evaluating comprises determining that an upcoming measurement or upcoming transmission or upcoming broadcast signal reception is planned at a time such that use of the first sleep mode is not possible or would require more overall energy consumption than using the lighter-sleep mode, given the one or more energy-related parameters for each sleep mode, and wherein said selecting comprises selecting the lighter-sleep mode, responsive to said determining.

4. The method of claim 2, wherein the sleep opportunity follows a wake-up signal, wherein said evaluating comprises determining that an upcoming on-interval of a discontinuous reception (DRX) cycle is planned at a time such that use of the first sleep mode is not possible or would require more overall energy consumption than using the lighter-sleep mode, given the one or more energy-related parameters, and wherein said selecting comprises selecting the lighter-sleep mode, responsive to said determining.

5. The method of claim 1, wherein the one or more energy-related parameters comprise any one or more of any of:
a transition time into or out of one of the plurality of possible sleep modes;
a power or energy consumption during a transition into or out of one of the plurality of possible sleep modes.

6. The method of claim 1, wherein said evaluating comprises considering one or more constraints on the sleep opportunity, the one or more constraints comprising any one or more of any of:
an effect of one of the plurality of possible sleep modes on an accuracy of time or frequency synchronization to a network signal; and
an effect of one of the plurality of possible sleep modes on an accuracy of automatic gain control tuning.

7. The method of claim 1, wherein said evaluating comprises considering one or more constraints on the sleep opportunity, the one or more constraints comprising any one or more of any of:
an upcoming measurement event;
an upcoming wake-up signal monitoring opportunity;
a type of operation required of the wireless device upon waking up after the sleep opportunity;
a latency requirement for an application executing on the wireless device.

8. The method of claim 1, wherein said evaluating comprises considering any one or more of any of:
a cross-slot scheduling indication;
a physical downlink control channel (PDCCH) skipping command;
an adaptation of a PDCCH monitoring period;
a go-to-sleep signal;
a Medium Access Control (MAC) discontinuous-receive (DRX) command;
a reconfiguration of a number of layers;
an antenna adaptation command;
a search space; and
a CORESET adaptation.

9. The method of claim 1, wherein the method further comprises adjusting a planned timing of one or more receiver monitoring or measurement operations and/or omitting one or more receiver monitoring or measurement operations, based on said evaluating.

10. A method of controlling a wireless device, the method comprising:
determining a sleep opportunity for the wireless device;
evaluating one or more energy-related parameters for a sleep mode for the wireless device, the sleep mode corresponding to a state of reduced energy consumption by the wireless device, relative to a non-sleep mode;
adjusting a planned timing of one or more receiver monitoring or measurement operations and/or omitting one or more receiver monitoring or measurement operations, based on said evaluating; and
activating the sleep mode.

11. The method of claim 10, wherein the one or more energy-related parameters comprise any one or more of any of:
a transition time into or out of the sleep mode;
a power or energy consumption during a transition into or out of the sleep mode.

12. The method of claim 10, wherein said evaluating comprises considering one or more constraints on the sleep opportunity, the one or more constraints comprising any one or more of any of:
an upcoming measurement event;
an upcoming wake-up signal monitoring opportunity;
an effect of the sleep mode on an accuracy of time or frequency synchronization to a network signal;
an effect of the sleep mode on an accuracy of automatic gain control tuning;
a type of operation required of the wireless device upon waking up after the sleep opportunity;
a latency requirement for an application executing on the wireless device.

13. A wireless device, the wireless device comprising:
radio circuitry configured to communicate with a wireless communication network;

processing circuitry operatively coupled to the radio circuitry and configured to control the radio circuitry and to:

determine a first sleep opportunity for the wireless device;

evaluate one or more energy-related parameters for each of a plurality of possible sleep modes for the wireless device, the plurality of possible sleep modes corresponding to varying degrees of reduced energy consumption by the wireless device, relative to a non-sleep mode;

select a first one of the plurality of possible sleep modes for the wireless device, based on said evaluating;

activate the selected sleep mode during the first sleep opportunity;

determine a second sleep opportunity for the wireless device, within a same discontinuous-receive (DRX) cycle for the wireless device;

perform a second evaluation of one or more energy-related parameters for each of the plurality of possible sleep modes for the wireless device;

select a second one of the plurality of possible sleep modes for the wireless device, based on said performing the second evaluation, the second one of the plurality of possible sleep modes differing from the first one of the plurality of possible sleep modes; and activate the second one of the plurality of sleep modes during the second sleep opportunity.

14. The wireless device of claim 13, wherein the plurality of possible sleep modes comprises a first sleep mode, in which at least a portion of the radio circuitry is inactivated and at least a portion of the processing circuitry is in a lowest power mode, and a lighter-sleep mode, in which the portion of the processing circuitry is in a higher power mode, relative to the lowest power mode.

15. The wireless device of claim 14, wherein the processing circuitry is configured to determine that an upcoming measurement or upcoming transmission or upcoming broadcast signal reception is planned at a time such that use of the first sleep mode is not possible or would require more overall energy consumption than using the lighter-sleep mode, given the one or more energy-related parameters for each sleep mode, and to select the lighter-sleep mode, responsive to said determining.

16. The wireless device of claim 13, wherein the one or more energy-related parameters comprise any one or more of any of:

a transition time into or out of one of the plurality of possible sleep modes;

a power or energy consumption during a transition into or out of one of the plurality of possible sleep modes.

17. A wireless device, comprising:

radio circuitry configured to communicate with a wireless communication network;

processing circuitry operatively coupled to the radio circuitry and configured to control the radio circuitry and to:

determine a sleep opportunity for the wireless device;

evaluate one or more energy-related parameters for a sleep mode for the wireless device, the sleep mode corresponding to a state of reduced energy consumption by the wireless device, relative to a non-sleep mode;

adjust a planned timing of one or more receiver monitoring or measurement operations and/or omit one or more receiver monitoring or measurement operations, based on said evaluating; and activate the sleep mode.

18. The wireless device of claim 17, wherein the one or more energy-related parameters comprise any one or more of any of:

a transition time into or out of the sleep mode;

a power or energy consumption during a transition into or out of the sleep mode.

* * * * *